United States Patent
Gustafsson et al.

(10) Patent No.: US 12,248,480 B2
(45) Date of Patent: Mar. 11, 2025

(54) PROVIDING DATA STREAMS TO A CLIENT

(71) Applicant: Telefonaktiebolaget LM Ericsson (PUBL), Stockholm (SE)

(72) Inventors: Harald Gustafsson, Lund (SE); Anshu Shukla, Bangalore (IN); Sambit Nayak, Orissa (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 118 days.

(21) Appl. No.: 17/772,044

(22) PCT Filed: Oct. 28, 2019

(86) PCT No.: PCT/EP2019/079401
§ 371 (c)(1),
(2) Date: Apr. 26, 2022

(87) PCT Pub. No.: WO2021/083482
PCT Pub. Date: May 6, 2021

(65) Prior Publication Data
US 2022/0374435 A1  Nov. 24, 2022

(51) Int. Cl.
*G06F 16/2455* (2019.01)
*G06F 9/54* (2006.01)
*H04L 67/10* (2022.01)

(52) U.S. Cl.
CPC ........ *G06F 16/24568* (2019.01); *G06F 9/546* (2013.01); *H04L 67/10* (2013.01)

(58) Field of Classification Search
CPC ..... G06F 16/24568; G06F 9/546; H04L 67/10
(Continued)

(56) References Cited

U.S. PATENT DOCUMENTS 6,298,455 B1   10/2001   Knapman et al.
2008/0010256 A1   1/2008   Lindblad et al.
(Continued)

FOREIGN PATENT DOCUMENTS

EP        128 447 A1    2/2017

OTHER PUBLICATIONS

Non-Final Office Action issued by the USPTO for U.S. Appl. No. 17/772,027—Mar. 27, 2023.
(Continued)

*Primary Examiner* — Joshua Bullock
(74) *Attorney, Agent, or Firm* — Baker Botts L.L.P.

(57) ABSTRACT

A method for providing data streams to a client over a network interface wherein the data streams comprise message data streams which form provenance views based on provenance information is disclosed. The method comprises, by a routing component; receiving (101), from a client, a request comprising a query for a provenance view submitted, obtaining (104) provenance information from a provenance information database based on the query of the received request, wherein the provenance information database comprises provenance relationships between provenance entities, obtaining (105) message data from a message data database based on the query of the received request, wherein the message data database comprises data corresponding to the provenance entities, deriving (106) correlated data based on the obtained provenance information and the obtained message data, and providing (109), to the client, the derived correlated data as a provenance view in message data streams. Corresponding computer program product, arrangement, routing component, and system are also disclosed.

18 Claims, 5 Drawing Sheets

(58) Field of Classification Search
USPC .......................................................... 707/769
See application file for complete search history.

(56) References Cited

U.S. PATENT DOCUMENTS

| | | |
|---|---|---|
| 2010/0114629 A1 | 5/2010 | Adler et al. |
| 2014/0143282 A1 | 5/2014 | Soundararajan et al. |
| 2015/0019553 A1* | 1/2015 | Shaashua .................. G06N 5/04 707/737 |
| 2016/0283589 A1 | 9/2016 | Bostick et al. |
| 2017/0161282 A1 | 6/2017 | Kemme et al. |
| 2018/0025307 A1 | 1/2018 | Hui et al. |
| 2018/0167476 A1 | 6/2018 | Hoffner et al. |
| 2019/0036804 A1 | 1/2019 | Mihelic et al. |
| 2019/0121979 A1 | 4/2019 | Chari et al. |
| 2019/0208032 A1 | 7/2019 | Sivasubramanian et al. |
| 2019/0236194 A1 | 8/2019 | James et al. |

OTHER PUBLICATIONS

PCT International Search Report issued for International application No. PCT/EP2019/079401—May 18, 2020.

Sansrimahachai et al., Stream Ancestor Function: A Mechanism for Fine-Grained Provenance in Stream Processing Systems (IEEE)—2011.

PCT Written Opinion of the International Searching Authority issued for International application No. PCT/EP2019/079401—May 18, 2020.

Non-Final Office Action issued by the USPTO for U.S. Appl. No. 17/772,027—Jun. 7, 2024.

Final Office Action issued by the USPTO for U.S. Appl. No. 17/772,027—Oct. 21, 2024.

* cited by examiner

PROVIDING DATA STREAMS TO A CLIENT

PRIORITY

This nonprovisional application is a U.S. National Stage Filing under 35 U.S.C. § 371 of International Patent Application Serial No. PCT/EP2019/079401 filed Oct. 28, 2019 and entitled "PROVIDING DATA STREAMS TO A CLIENT" which is hereby incorporated by reference in its entirety.

TECHNICAL FIELD

The present disclosure relates generally to the field of data streams. More particularly, it relates to providing data streams to a client over a network interface.

BACKGROUND

Data is more and more consumed via streaming and/or in real-time to allow processing as soon as possible to derive e.g. knowledge.

Such data may be arranged in streams which may each have multiple producers and/or consumers of individual topics.

A first drawback of known data streaming is that semantics between individual topics differ and cannot be handled efficiently.

A second drawback of known data streaming is that the queries for generating the data stream are difficult to construct.

Therefore, there is a need for alternative approaches for providing data streams to a client over a network interface.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other drawbacks.

According to a first aspect, this is achieved by a method for providing data streams to a client over a network interface wherein the data streams comprise message data streams which form provenance views based on provenance information.

The method comprises steps being performed by a routing component.

The method comprises receiving, from a client, a request comprising a query for a provenance view submitted, obtaining provenance information from a provenance information database based on the query of the received request, wherein the provenance information database comprises provenance relationships between provenance entities, and obtaining message data from a message data database based on the query of the received request, wherein the message data database comprises data corresponding to the provenance entities.

The method further comprises deriving correlated data based on the obtained provenance information and the obtained message data, and providing, to the client, the derived correlated data as a provenance view in message data streams.

In some embodiments, the query is indicative of one or more view topic identifiers for the provenance information and the message data for identifying which provenance entities and/or relationships to be included and which provenance entities and/or relationships the message data streams should be grouped by in the provenance view.

In some embodiments, the query is further indicative of message data identifiers for messages, or segments of data in a message data stream, for which message data streams should be provided.

In some embodiments, the query is further indicative of a time interval criterion for identifying a time interval for which the message data streams should be provided.

In some embodiments, the query is further indicative of a continuation criterion for determining whether to continue obtaining provenance information and message data, deriving correlated data, and providing message data streams for as long as there is new corresponding data to the provenance entities in the message data database.

In some embodiments, the provenance view comprises a range view.

In some embodiments, the provenance information database and message data database are relational databases and/or graph databases.

In some embodiments, deriving correlated data comprises copying message data or referencing individual—or ranges of—message data for later look-up.

In some embodiments, the method further comprises joining, by the routing component, the derived correlated data in message data streams to form the provenance view.

In some embodiments, the method further comprises notifying, by the routing component, the client that the requested provenance view is available for provision.

In some embodiments, the method further comprises generating, by the routing component, a request identifier for the received request, and providing, by the routing component, the generated request identifier to the client for identification of the requested provenance view when provided to the client.

In some embodiments, the method comprises receiving, by the routing component, a plurality of requests from a plurality of clients and providing, by the routing component, corresponding provenance views, wherein each of the plurality of requests and the corresponding provenance views are identifiable by the per request generated request identifier.

In some embodiments, the routing component is a message broker.

In some embodiments, the provenance information comprises any one of: information on where data was collected, information on for what purpose data was collected, information on for what context data was collected, information on for whom data was collected, information on who has accessed the collected data, attributes of the collected data, updates to the collected data, creation of the collected data, and lineage of collected data, depending on data type and environment of collection.

In some embodiments, the data streams provided to the client over the network interface relate to any one of: industrial robotics, sensors in a building, and production machines.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an arrangement for a routing component, wherein the routing component is configured for providing data streams to a client over a network interface wherein the data streams comprise message data streams which form provenance views based on provenance information.

The arrangement comprises a controller configured to cause reception, from a client, of a request comprising a query for a provenance view submitted, obtainment of provenance information from a provenance information database based on the query of the received request, wherein the provenance information database comprises provenance relationships between provenance entities, and obtainment of message data from a message data database based on the query of the received request, wherein the message data database comprises data corresponding to the provenance entities.

The controller is further configured to cause derivation of correlated data based on the obtained provenance information and the obtained message data, and provision, to the client, of the derived correlated data as a provenance view in message data streams.

In some embodiments, the query is indicative of one or more view topic identifiers for the provenance information and the message data for identifying which provenance entities and/or relationships to be included and which provenance entities and/or relationships the message data streams should be grouped by in the provenance view.

In some embodiments, the query is further indicative of message data identifiers for messages, or segments of data in a message data stream, for which message data streams should be provided.

In some embodiments, the query is further indicative of a time interval criterion for identifying a time interval for which the message data streams should be provided.

In some embodiments, the query is further indicative of a continuation criterion for determining whether to continue obtaining provenance information and message data, deriving correlated data, and providing message data streams for as long as there is new corresponding data to the provenance entities in the message data database.

In some embodiments, the provenance view comprises a range view.

In some embodiments, the provenance information database and message data database are relational databases and/or graph databases.

In some embodiments, derivation of correlated data comprises copying message data or referencing individual—or ranges of—message data for later look-up.

In some embodiments, the controller is further configured to cause joining of the derived correlated data in message data streams to form the provenance view.

In some embodiments, the controller is further configured to cause notification to the client that the requested provenance view is available for provision.

In some embodiments, the controller is further configured to cause generation of a request identifier for the received request, and provision of the generated request identifier to the client for identification of the requested provenance view when provided to the client.

In some embodiments, the controller is further configured to cause reception of a plurality of requests from a plurality of clients, and provision of corresponding provenance views, wherein each of the plurality of requests and the corresponding provenance views are identifiable by the per request generated request identifier.

In some embodiments, the routing component is a message broker.

In some embodiments, the provenance information comprises any one of: information on where data was collected, information on for what purpose data was collected, information on for what context data was collected, information on for whom data was collected, information on who has accessed the collected data, attributes of the collected data, updates to the collected data, creation of the collected data, and lineage of collected data, depending on data type and environment of collection.

In some embodiments, the data streams provided to the client over the network interface relate to any one of: industrial robotics, sensors in a building, and production machines.

A fourth aspect is a routing component comprising the arrangement according to the third aspect.

A fifth aspect is a system comprising the arrangement according to the third aspect and/or the routing component according to the fourth aspect.

In some embodiments, the system further comprises at least one client, a provenance information database, and a message data database.

An advantage of some embodiments is that alternative approaches for providing data streams to a client over a network interface are provided.

Another advantage of some embodiments is that semantics between individual topics may be handled by a routing component efficiently.

Yet an advantage of some embodiments is that queries for generating the data streams may be constructed more easily.

Any of the above aspects may additionally have features identical with or corresponding to any of the various features as explained above for any of the other aspects.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

As mentioned above, data is more and more consumed via streaming and/or in real-time to allow processing as soon as possible to derive e.g. knowledge and such data may be arranged in streams which may each have multiple producers and/or consumers of individual topics.

When there are many data sources for consuming data it may beneficial to keep (i.e., obtain, store, maintain, and update) provenance information of data; e.g. where it was collected, for what purpose, in what context, for whom, etc. Such provenance information, or metadata, comprises in addition information about the relationships between the data sources, i.e. provenance entities.

Provenance information may be created as provenance type schemes and their relationships e.g. in a provenance graph data type. An example of a relationship may comprise e.g. for a context that contains a product which is constituted by items, the items referring to tasks made on such items. Hence, individual messages of data in a stream may be related to such a context.

Provenance information may be continuously published as it is obtained, stored, maintained, and updated, e.g. as new provenance information is produced (new context for a machine) or new data messages on a specific topic are available.

In the following, embodiments will be presented where alternative approaches for providing data streams to a client over a network interface are described.

Figure 1:
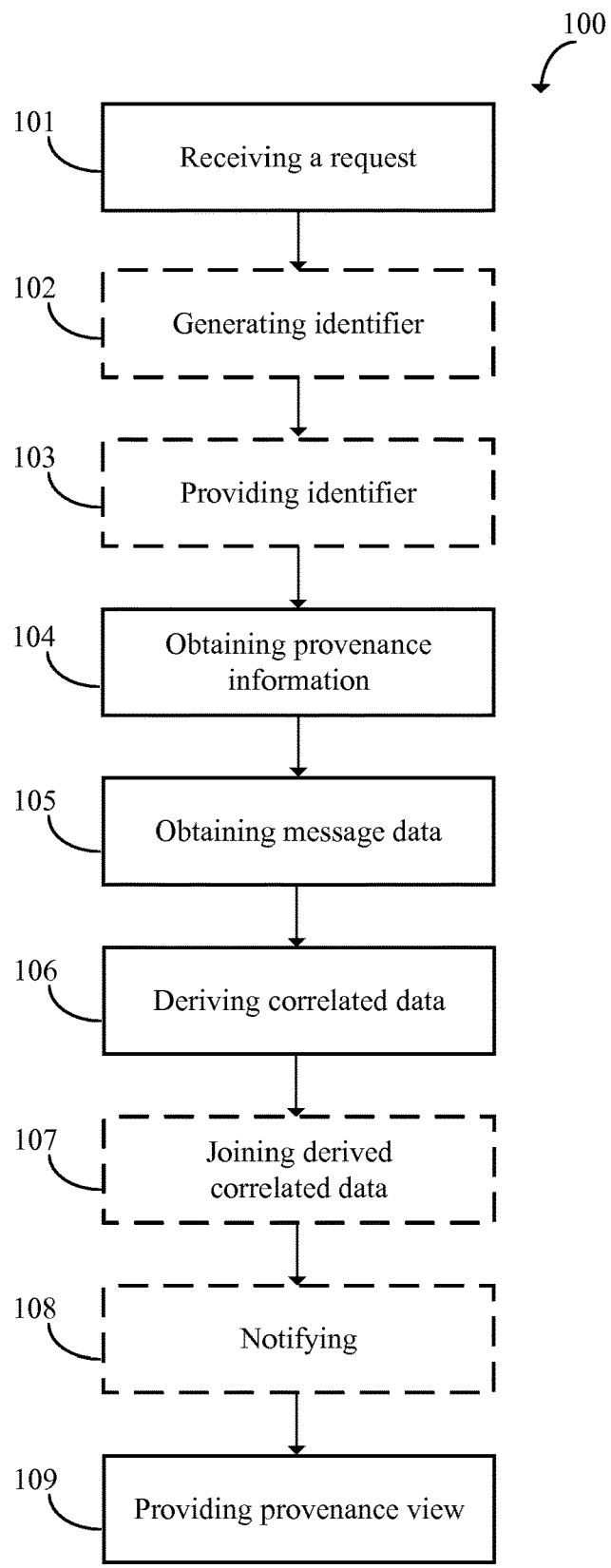
FIG. 1 is a flowchart illustrating example method steps according to some embodiments.

FIG. 1 is a flowchart illustrating method steps of an example data provisioning method 100 according to some embodiments. The data provisioning method 100 is for providing data streams to a client over a network interface wherein the data streams comprise message data streams which form provenance views based on provenance information. Thus, the data provisioning method 100 may, for example, be performed by the arrangement 400 of FIG. 4 and/or the computer program product 500 of FIG. 5; both of which will be described later herein.

The data provisioning method 100 comprises the following steps being performed by a routing component.

In step 101, a submitted request from a client comprising a query for a provenance view is received.

For example, a client may comprise a consuming client requesting a provenance view, i.e. a streaming provenance view.

Alternatively or additionally, the submitted request may in addition to the query comprise information about the client submitting the request for identification purposes.

In some embodiments, the query is indicative of one or more view topic identifiers for the provenance information and the message data for identifying which provenance entities and/or relationships to be included and which provenance entities and/or relationships the message data streams should be grouped by in the provenance view.

For example, the provenance entities may comprise data sources and be represented in graph nodes and their relationships as edges.

For example, the grouping of data streams in the provenance view may be based on the provenance entities, e.g. product serial numbers.

In some embodiments, the provenance view comprises a range view.

For example, the range view may comprise ranges of data messages.

In some embodiments, the query is further indicative of message data identifiers for messages, or segments of data in a message data stream, for which message data streams should be provided.

In some embodiments, the query is further indicative of a time interval criterion for identifying a time interval for which the message data streams should be provided.

In some embodiments, the query is further indicative of a continuation criterion for determining whether to continue obtaining provenance information and message data, deriving correlated data, and providing message data streams for as long as there is new corresponding data to the provenance entities in the message data database.

In optional step 102, in some embodiments, a request identifier is generated for the received request.

For example, the routing component may generate an identifier, e.g. a job identity event, and build a table with all job identities and corresponding data.

In optional step 103, in some embodiments, the generated request identifier is provided to the client for identification of the requested provenance view when provided to the client.

In step 104, provenance information is obtained from a provenance information database based on the query of the received request, wherein the provenance information database comprises provenance relationships between provenance entities.

In some embodiments, the provenance information database and message data database are relational databases and/or graph databases.

In step 105, message data is obtained from a message data database based on the query of the received request, wherein the message data database comprises data corresponding to the provenance entities.

In some embodiments, the provenance information database and message data database are relational databases and/or graph databases.

In step 106, correlated data is derived based on the obtained provenance information and the obtained message data.

In some embodiments, deriving correlated data comprises copying message data or referencing individual—or ranges of—message data for later look-up.

For example, a data stream is derived for a view by copying data messages from actual data streams. Alternatively or additionally, this may be performed first on actual request of data from this view stream.

For example, a data stream is derived for a view by referencing for individual data messages from actual data streams. Alternatively or additionally, this may be performed first on actual request of data from this view stream.

For example, a data stream is derived for a view by referencing to ranges of data messages from actual data streams. Alternatively or additionally, this may be performed first on actual request of data from this view stream.

For example, a data stream is derived for a view by only accepting connections and when consuming client subscribes/reads data message, wherein lookup is performed in the actual data message stream.

For example, for the provenance entities in—or related to—the requested view, time intervals may be identified for one or more data streams during which data messages related to such provenance entities are provided.

Alternatively or additionally, a similar correlation based on logical information instead of time information may be performed, e.g. individual message identifiers, data segment identifiers in data stream, etc.

Alternatively or additionally, provenance relationships are used to the extent possible to derive correlated data as, for example, an item may pass through multiple machines in a manufacturing pipeline or conveyor belt.

In optional step 107, in some embodiments, the derived correlated data is joined in message data streams to form the provenance view.

Hence, this allows to join a table and/or filter a data stream.

In optional step 108, in some embodiments, the client is notified that the requested provenance view is available for provision.

For example, the routing component may publish such information in a data message on an agreed-on data stream topic or as a streamed Hypertext Transfer Protocol (HTTP) response, etc.

In step 109, the derived correlated data is provided to the client as a provenance view in message data streams.

In some embodiments, steps 104, 105, 106, and 109 are repeated for every submitted request so that message data streams are provided to the client.

In some embodiments, the method further comprises receiving a plurality of requests from a plurality of clients and providing corresponding provenance views and wherein each of the plurality of requests and the corresponding provenance views are identifiable by the per request generated request identifier.

In some embodiments, the routing component is a message broker.

Hence, in view of above method steps, provision of data streams based on provenance information is facilitated.

An advantage of some embodiments is that alternative approaches for providing data streams to a client over a network interface are provided.

Another advantage of some embodiments is that semantics between individual topics may be handled by a routing component efficiently.

Yet an advantage of some embodiments is that queries for generating the data streams may be constructed more easily.

Figure 2:
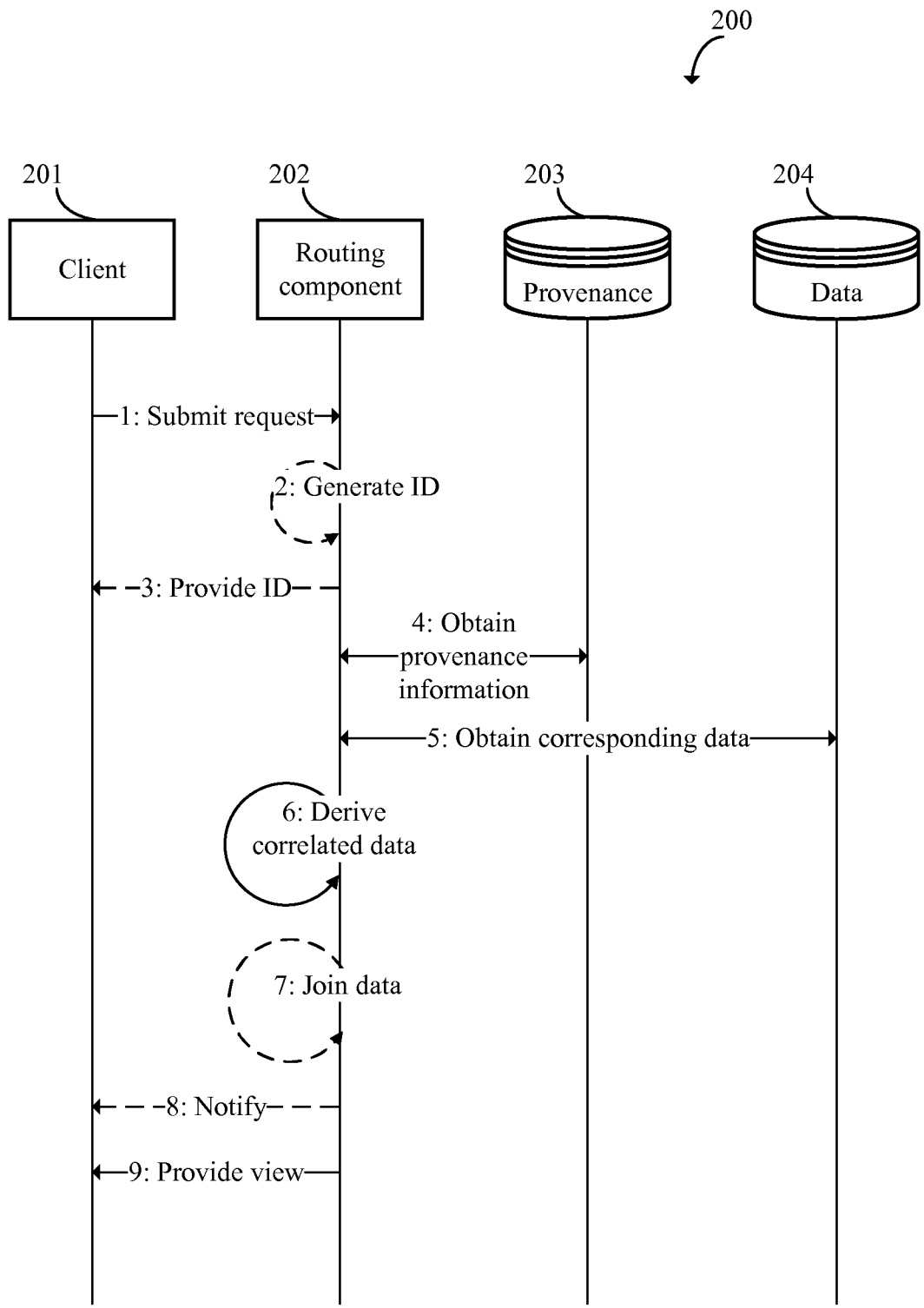
FIG. 2 is a sequence diagram illustrating example sequence steps according to some embodiments.

FIG. 2 is a sequence diagram illustrating sequence steps of an example data provisioning sequence 200 according to some embodiments. The data provisioning sequence 200 is for providing data streams to a client over a network interface wherein the data streams comprise message data streams which form provenance views based on provenance information. Thus, the data provisioning sequence 200 may, for example, be performed by the arrangement 400 of FIG. 4 and/or the computer program product 500 of FIG. 5; both of which will be described later herein.

The data provisioning sequence 200 comprises the following steps being performed by a client 201 and a routing component 202.

In step 1, corresponding to step 101 of FIG. 1, a request is submitted to a routing component 202 from a client 201 comprising a query for a provenance view.

In optional step 2, corresponding to step 102 of FIG. 1, in some embodiments, a request identifier ID is generated by the routing component 202 for the submitted and received request.

In optional step 3, corresponding to step 103 of FIG. 1, in some embodiments, the generated request identifier ID is provided by the routing component 202 to the client 201 for identification of the requested provenance view when provided to the client 201.

In step 4, corresponding to step 104 of FIG. 1, provenance information is obtained by the routing component 202 from a provenance information database 203 based on the query of the received request, wherein the provenance information database comprises provenance relationships between provenance entities.

In step 5, corresponding to step 105 of FIG. 1, message data is obtained by the routing component 202 from a message data database 204 based on the query of the received request, wherein the message data database comprises data corresponding to the provenance entities.

In step 6 corresponding to step 106 of FIG. 1, correlated data is derived by the routing component 202 based on the obtained provenance information and the obtained message data.

In optional step 7, corresponding to step 107 of FIG. 1, in some embodiments, the derived correlated data is joined in message data streams to form the provenance view by the routing component 202.

In optional step 8, corresponding to step 108 of FIG. 1, in some embodiments, the client 201 is notified that the requested provenance view is available for provision by the routing component 202.

In step 9, corresponding to step 109 of FIG. 1, the derived correlated data is provided by the routing component 202 to the client 201 as a provenance view in message data streams.

In some embodiments, steps 4, 5, 6, and 9 are repeated for every submitted request from the client 201 so that message data streams are provided to the client 201.

Hence, in view of above sequence steps, provision of data streams based on provenance information is facilitated.

Figure 3A:
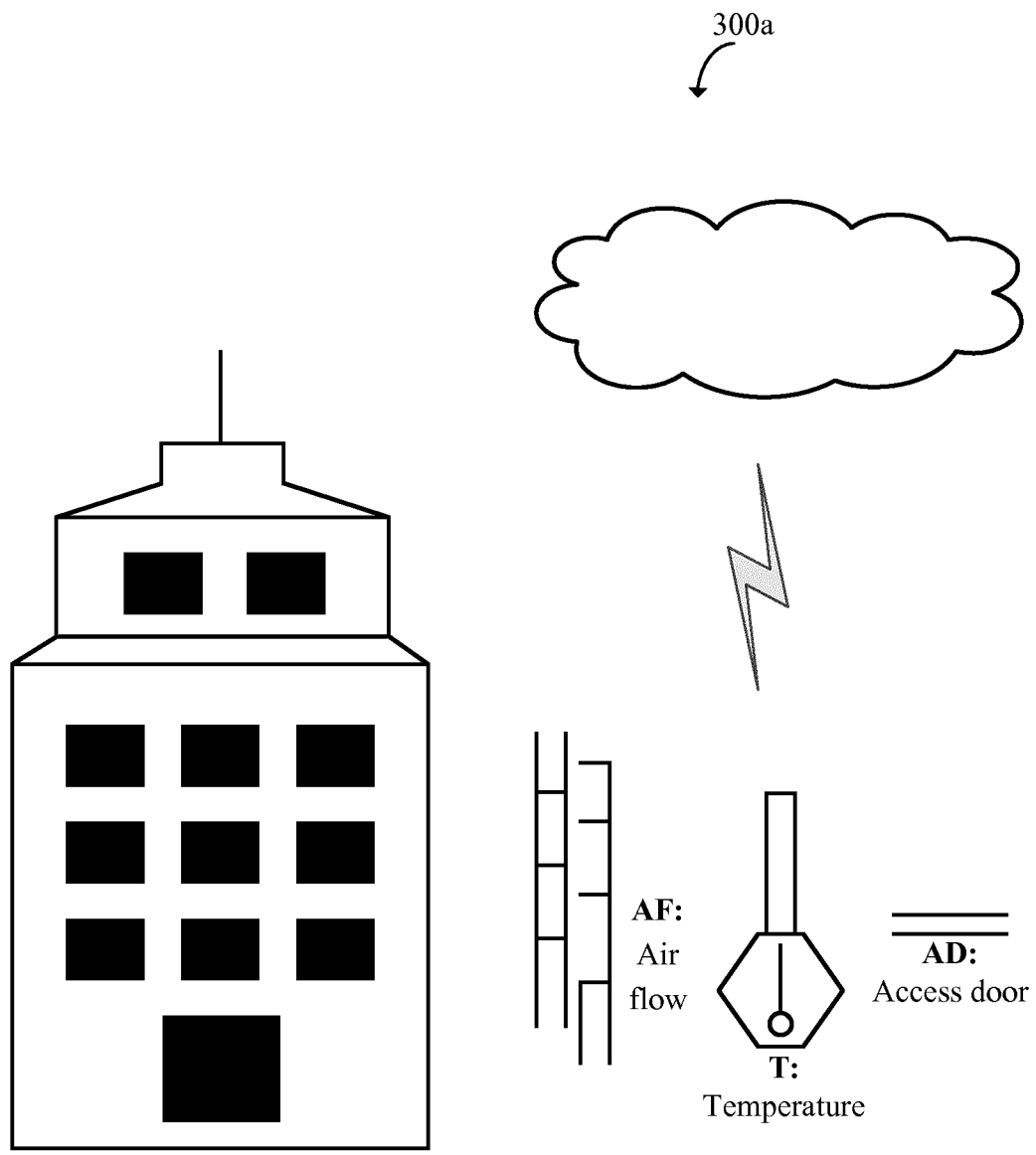
FIG. 3a is a schematic drawing illustrating example sensors of an example environment according to some embodiments.

FIG. 3a is a schematic drawing illustrating example sensors of an example data provisioning environment 300a according to some embodiments. The sensors and the data provisioning environment 300a are for providing data streams to a client over a network interface wherein the data streams comprise message data streams which form provenance views based on provenance information. Thus, the sensors and the data provisioning environment 300a may, for example, be comprised in a system comprising the arrangement 400 of FIG. 4 and/or the computer program product 500 of FIG. 5; both of which will be described later herein.

Figure 4:
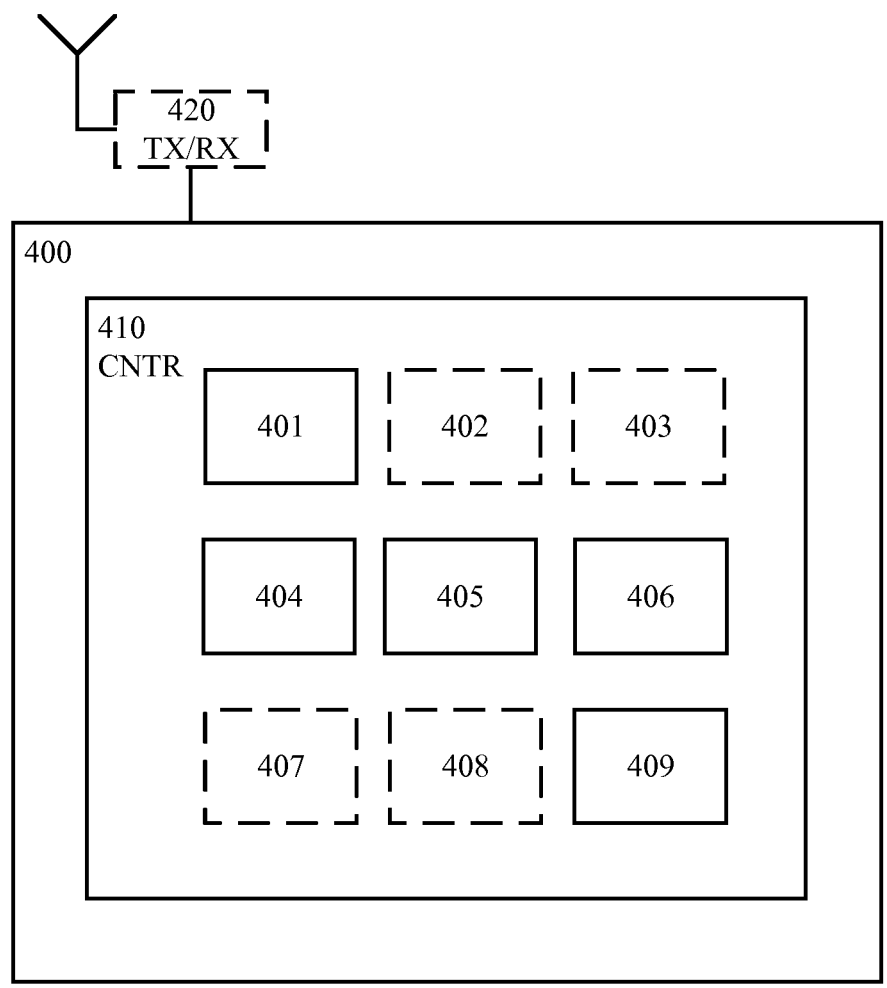
FIG. 4 is a schematic block diagram illustrating an example arrangement according to some embodiments.

Alternatively or additionally, the system may comprise a routing component and/or the arrangement 400 of FIG. 4.

For example, the routing component (corresponding to 202 of FIG. 2) may comprise the arrangement 400 of FIG. 4.

The system may, in some embodiments, further comprise at least one client (corresponding to 201 of FIG. 2), a provenance information database (corresponding to 203 of FIG. 2), and a message data database (corresponding to 204 of FIG. 2).

FIG. 3a illustrates a building comprising at least one sensor. The at least one sensor may comprise any one of a sensor for air flow AF, a sensor for temperature T, and a sensor for door accesses AD. The at least one sensor is configured to collect and store data according to the purpose of the sensor and communicate wirelessly with a cloud service for storing collected data. The collected and stored data comprises message data for storage in a message data database and may be correlated with provenance entities and/or relationships stored in a provenance information database.

In some embodiments, the provenance information database and message data database are relational databases and/or graph databases.

Hence, as provenance information and message data are stored in a distributed system e.g. in a cloud service, there is no need for the routing component to comprise the provenance information nor the message data and a more efficient routing component is provided.

For example, the building may comprise at least one sensor per floor, e.g. Building/Floor/Sensor, or per floor per room, e.g. Building/Floor/Room/Sensor. Hence, a topic identifier may identify a certain type of data (air flow, temperature, door accesses) for a certain location (room or floor) in the building, e.g. Temperature for a particular room in the Building, from one sensor or a plurality of sensors configured to collect the certain type of data arranged in the certain location based on provenance entities and/or relationships, wherein the provenance entities may comprise any one of Building, Floor, Room, Sensor and relationships comprise any relationship between the provenance entities.

Hence, in view of above, provision of data streams based on provenance information is facilitated.

Figure 3B:
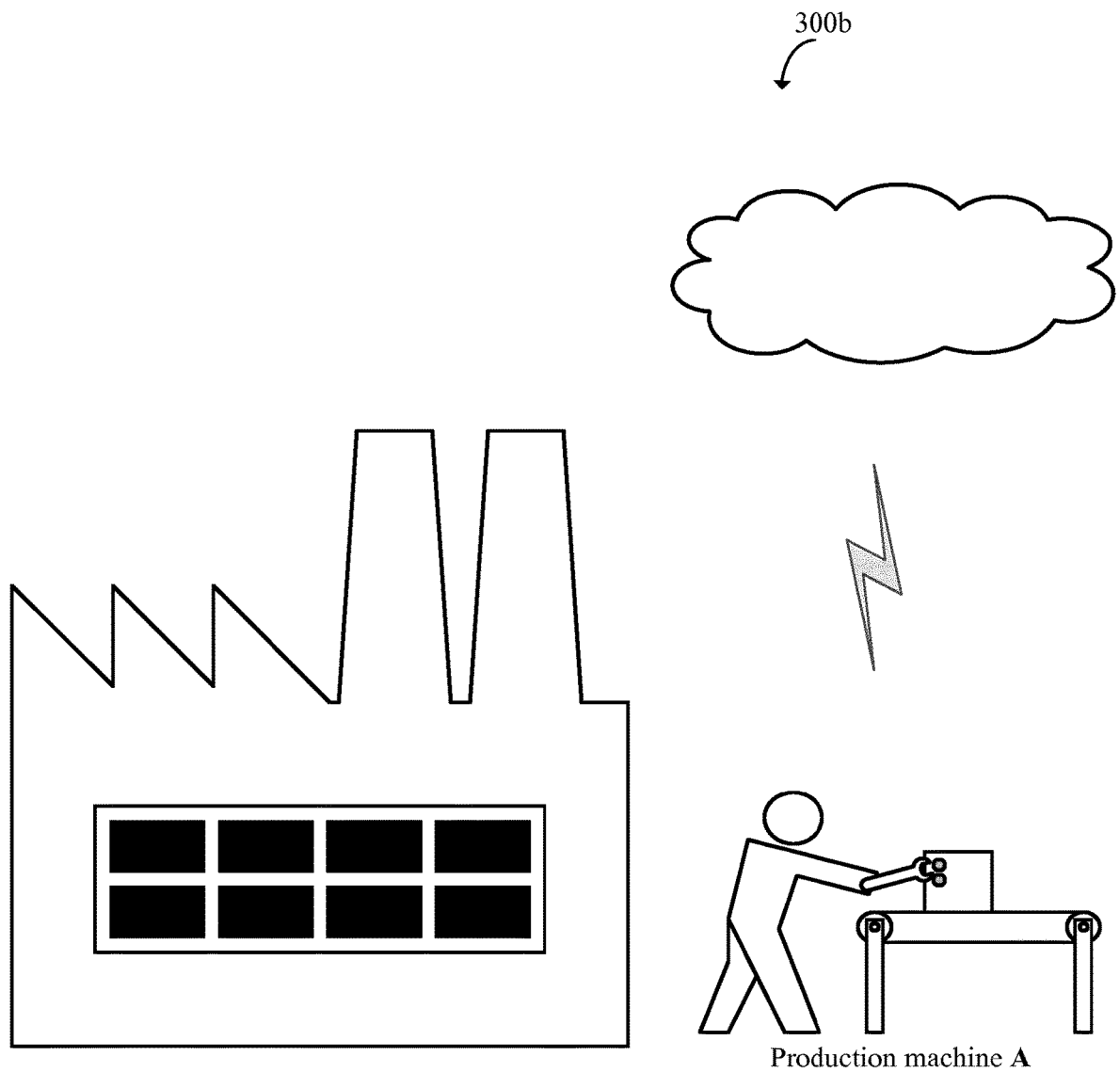
FIG. 3b is a schematic drawing illustrating example sensors of an example environment according to some embodiments.

FIG. 3b is a schematic drawing illustrating example sensors of an example data provisioning environment 300b according to some embodiments. The sensors and the data provisioning environment 300b are for providing data streams to a client over a network interface wherein the data streams comprise message data streams which form provenance views based on provenance information. Thus, the sensors and the data provisioning environment 300b may, for example, be comprised in a system comprising the arrangement 400 of FIG. 4 and/or the computer program product 500 of FIG. 5; both of which will be described later herein.

Alternatively or additionally, the system may comprise a routing component and/or the arrangement 400 of FIG. 4.

For example, the routing component (corresponding to 202 of FIG. 2) may comprise the arrangement 400 of FIG. 4.

The system may, in some embodiments, further comprise at least one client (corresponding to 201 of FIG. 2), a provenance information database (corresponding to 203 of FIG. 2), and a message data database (corresponding to 204 of FIG. 2).

FIG. 3b illustrates a factory (or industrial plant) comprising at least one sensor arranged on machines and/or equipment e.g. production machine A. The at least one sensor may comprise any one of a sensor for indicating status of machinery, a sensor for internal temperature of machinery, a pressure sensor, a proximity sensor, an optical sensor, and a position sensor. The at least one sensor is configured to collect and store data according to the purpose of the sensor and communicate wirelessly with a cloud service for storing collected data. The collected and stored data comprises message data for storage in a message data database and may be correlated with provenance entities and/or relationships stored in a provenance information database.

In some embodiments, the provenance information database and message data database are relational databases and/or graph databases.

Hence, as provenance information and message data are stored in a distributed system e.g. in a cloud service, there is no need for the routing component to comprise the provenance information nor the message data and a more efficient routing component is provided.

For example, the factory may comprise at least one sensor per machine per area, e.g. Factory/Area/Machine/Sensor, or per machine part per machine per area, e.g. Factory/Area/Machine/Part/Sensor. Hence, a topic identifier may identify a certain type of data (status, internal temperature etc.) for a certain machine in a certain area (production area) in the factory, e.g. Status for Machine A in a particular area in the Factory, from one sensor or a plurality of sensors configured to collect the certain type of data arranged on the certain machine based on provenance entities and/or relationships, wherein the provenance entities may comprise any one of Factory, Area, Machine, Part, Sensor and relationships comprise any relationship between the provenance entities.

For example, a product assembled in the factory may have a product serial number and any tasks in the machinery that produced items for the product has a task number and each item an item number which may be considered to be provenance information.

The machinery that produced the product has in the process produced data in streams during the different operations for each topic, e.g. arm positions or vibration measurements. The data streams for the product are then delivered as product view streams on topics.

For example, if a topic identifier is /machine1/vibrationA then a view topic identifier becomes /product12/item99/machine1/vibrationA. Hence, such identifiers are constantly updated when e.g. product with serial number 13 starts being processed.

When needing to analyse data for a full product, different ranges for individual items on various topics may be needed. The items may pass multiple machines and may not be handled in any particular order and with other operations in between.

Hence, data streams may be broken up into separate views for individual item ranges, to enable efficient processing. Alternatively or additionally, such processing may also be triggered first when all included data stream views are available.

For example, while a machine produces an item identified by an item number, the provenance graph nodes for such machine and item are related, and further the provenance graph node for the machine is related to the data streams pertaining to the sensor measurements on that machine. Time intervals can be correlated across the machine and item number provenance information with those on the sensor data topics to identify correlated data ranges for that item.

Hence, in view of above, provision of data streams based on provenance information is facilitated.

FIG. 4 is a schematic block diagram illustrating an example data provisioning arrangement 400 according to some embodiments. The data provisioning arrangement 400 is for a routing component, wherein the routing component is configured for providing data streams to a client over a network interface wherein the data streams comprise message data streams which form provenance views based on provenance information. Thus, the data provisioning arrangement 400 may, for example, be configured to perform one or more of the method steps of FIG. 1 and/or the sequence steps of FIG. 2.

The data provisioning arrangement 400 comprises a controller, e.g. device controlling circuitry, configured to cause reception, from a client, of a submitted request comprising a query for a provenance view, obtainment of provenance information from a provenance information database based on the query of the received request, wherein the provenance information database comprises provenance relationships between provenance entities, and obtainment of message data from a message data database based on the query of the received request, wherein the message data database comprises data corresponding to the provenance entities.

The controller is further configured to cause derivation of correlated data based on the obtained provenance information and the obtained message data, and provision, to the client, of the derived correlated data as a provenance view in message data streams.

Figure 5:
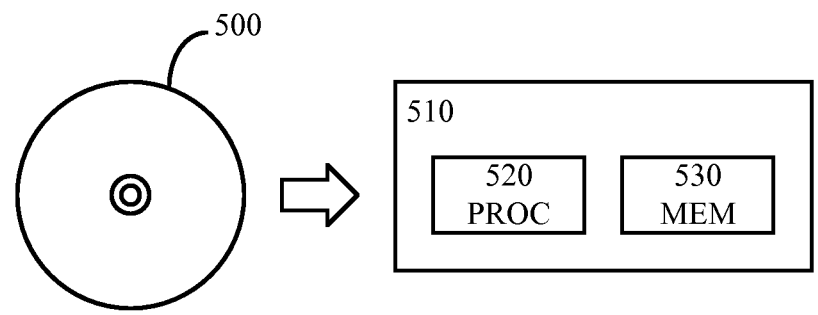
FIG. 5 is a schematic drawing illustrating an example computer readable medium according to some embodiments.

The data provisioning arrangement 400 for a routing component comprises, as mentioned above, a controller (CNTR; e.g., a control circuitry or a controlling module) 410, which may in turn comprise, (or be otherwise associated with; e.g., connected or connectable to), a receiver 401 (e.g. receiving circuitry or a receiving module), configured to receive from a client a submitted request comprising a query for a provenance view (compare with step 101 of FIG. 1 and step 1 of FIG. 2), an obtainer 404 (e.g. obtaining circuitry or obtaining module) configured to obtain provenance information from a provenance information database based on the query of the received request, wherein the provenance information database comprises provenance relationships between provenance entities (compare with step 104 of FIG. 1 and step 4 of FIG. 2), and an obtainer 405 (e.g. obtaining circuitry or obtaining module) configured to obtain message data from a message data database based on the query of the received request, wherein the message data database comprises data corresponding to the provenance entities (compare with step 105 of FIG. 1 and step 5 of FIG. 5).

The CNTR 410 further comprises, (or is otherwise associated with; e.g., connected or connectable to), a deriver 406 (e.g. deriving circuitry or deriving module) configured to derive correlated data based on the obtained provenance information and the obtained message data (compare with step 106 of FIG. 1 and step 6 of FIG. 2), and a provider 409 (e.g. providing circuitry or providing module) configured to provide to the client the derived correlated data as a provenance view in message data streams (compare with step 109 of FIG. 1 and step 9 of FIG. 2).

In some embodiments, the CNTR 410 further comprises, (or is otherwise associated with; e.g., connected or connectable to), a generator 402 (e.g. generating circuitry or generating module) configured to generate a request identifier for the received request (compare with step 102 of FIG. 1 and step 2 of FIG. 2), and a provider 403 (e.g. providing circuitry or providing module) configured to provide the generated request identifier to the client for identification of the requested provenance view when provided to the client (compare with step 103 of FIG. 1 and step 3 of FIG. 2).

In some embodiments, the CNTR 410 further comprises, (or is otherwise associated with; e.g., connected or connectable to), a joiner 407 (e.g. joining circuitry or joining module) configured to join the derived correlated data in message data streams to form the provenance view (compare with step 107 of FIG. 1 and step 7 of FIG. 2), and a notifier 408 (e.g. notifying circuitry or notifying module) configured to notify the client that the requested provenance view is available for provision (compare with step 108 of FIG. 1 and step 8 of FIG. 2).

The arrangement 400 may further comprise, (or be otherwise associated with; e.g., connected or connectable to), in some embodiments, a transceiving module TX/RX 420, e.g. transceiving circuitry, configured to transmit and receive radio signals e.g. for receiving from a client a submitted request comprising a query for a provenance view and/or for providing to the client the derived correlated data as a provenance view in message data streams.

Hence, in view of above arrangement, provision of data streams based on provenance information is facilitated.

An advantage of some embodiments is that alternative approaches for providing data streams to a client over a network interface are provided.

Another advantage of some embodiments is that semantics between individual topics may be handled by a routing component efficiently.

Yet an advantage of some embodiments is that queries for generating the data streams may be constructed more easily.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device.

Embodiments may appear within an electronic apparatus (such as a wireless communication device) comprising arrangements, circuitry, and/or logic according to any of the embodiments described herein. Alternatively or additionally, an electronic apparatus (such as a wireless communication device) may be configured to perform methods according to any of the embodiments described herein.

According to some embodiments, a computer program product comprises a computer readable medium such as, for example a universal serial bus (USB) memory, a plug-in card, an embedded drive or a read only memory (ROM).

FIG. 5 illustrates an example computer readable medium in the form of a compact disc (CD) ROM 500. The computer readable medium has stored thereon a computer program comprising program instructions. The computer program is loadable into a data processor (PROC) 520, which may, for example, be comprised in a wireless communication device 510. When loaded into the data processing unit, the computer program may be stored in a memory (MEM) 530 associated with or comprised in the data-processing unit.

In some embodiments, the computer program may, when loaded into and run by the data processing unit, cause execution of method steps according to, for example, FIG. 1 and/or sequence steps according to, for example, FIG. 2 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method for providing data streams to a client over a network interface wherein the data streams comprise message data streams which form provenance views based on provenance information, the method comprising the following steps being performed by a routing component:
   receiving, from a client, a submitted request comprising a query for a provenance view, wherein the query is indicative of a continuation criterion for determining whether to continue obtaining provenance information and message data, deriving correlated data, and providing message data streams for as long as there is new corresponding data to the provenance entities in the message data database,
   obtaining provenance information from a provenance information database based on the query of the received request, wherein the provenance information database comprises provenance relationships between provenance entities,
   obtaining message data from a message data database based on the query of the received request, wherein the message data database comprises data corresponding to the provenance entities,
   deriving correlated data based on the obtained provenance information and the obtained message data, and
   providing, to the client, the derived correlated data as a provenance view in message data streams.

2. The method according to claim 1, wherein the query is indicative of one or more view topic identifiers for the provenance information and the message data for identifying which provenance entities and/or relationships to be included and which provenance entities and/or relationships the message data streams should be grouped by in the provenance view.

3. The method according to claim 1, wherein the query is further indicative of message data identifiers for messages, or segments of data in a message data stream, for which message data streams should be provided.

4. The method according to claim 1, wherein the query is further indicative of a time interval criterion for identifying a time interval for which the message data streams should be provided.

5. An apparatus for a routing component, wherein the routing component is configured for providing data streams to a client over a network interface wherein the data streams comprise message data streams which form provenance views based on provenance information, the apparatus comprising a controller configured to cause:
   reception, from a client, of a submitted request comprising a query for a provenance view, wherein the query is further indicative of a continuation criterion for determining whether to continue obtaining provenance information and message data, deriving correlated data, and providing message data streams for as long as there is new corresponding data to the provenance entities in the message data database,
   obtainment of provenance information from a provenance information database based on the query of the received request, wherein the provenance information database comprises provenance relationships between provenance entities,
   obtainment of message data from a message data database based on the query of the received request, wherein the message data database comprises data corresponding to the provenance entities,
   derivation of correlated data based on the obtained provenance information and the obtained message data, and
   provision, to the client, of the derived correlated data as a provenance view in message data streams.

6. The apparatus according to claim 5, wherein the query is indicative of one or more view topic identifiers for the provenance information and the message data for identifying which provenance entities and/or relationships to be included and which provenance entities and/or relationships the message data streams should be grouped by in the provenance view.

7. The apparatus according to claim 5, wherein the query is further indicative of message data identifiers for messages, or segments of data in a message data stream, for which message data streams should be provided.

8. The apparatus according to claim 5, wherein the query is further indicative of a time interval criterion for identifying a time interval for which the message data streams should be provided.

9. The apparatus according to claim 5, wherein the provenance view comprises a range view.

10. The apparatus according to claim 5, wherein the provenance information database and message data database are relational databases and/or graph databases.

11. The apparatus according to claim 5, wherein derivation of correlated data comprises copying message data or referencing individual—or ranges of—message data for later look-up.

12. The apparatus according to claim 5, wherein the controller is further configured to cause:
   joining of the derived correlated data in message data streams to form the provenance view.

13. The apparatus according to claim 5, wherein the controller is further configured to cause:
   notification to the client that the requested provenance view is available for provision.

14. The apparatus according to claim 5, wherein the controller is further configured to cause:

generation of a request identifier for the received request, and provision of the generated request identifier to the client for identification of the requested provenance view when provided to the client.

15. The apparatus according to claim 5, wherein the controller is further configured to cause reception of a plurality of requests from a plurality of clients, and provision of corresponding provenance views, wherein each of the plurality of requests and the corresponding provenance views are identifiable by the per request generated request identifier.

16. The apparatus according to claim 5, wherein the routing component is a message broker.

17. The apparatus according to claim 5, wherein the provenance information comprises any one of: information on where data was collected, information on for what purpose data was collected, information on for what context data was collected, information on for whom data was collected, information on who has accessed the collected data, attributes of the collected data, updates to the collected data, creation of the collected data, and lineage of collected data, depending on data type and environment of collection.

18. The apparatus according to claim 5, wherein the data streams provided to the client over the network interface relate to any one of: industrial robotics, sensors in a building, and production machines.

* * * * *